United States Patent [19]

Huggins et al.

[11] Patent Number: 5,673,592
[45] Date of Patent: Oct. 7, 1997

[54] MANUALLY SHIFTED TRANSMISSION WITH ENHANCED AUTOMATIC RANGE SHIFT

[75] Inventors: Michael J. Huggins, Kalamazoo; Joseph D. Reynolds, Climax; David L. Wadas, Kalamazoo; Sharon L. Gualtieri, Schoolcraft, all of Mich.

[73] Assignee: Eaton Corporation, Cleveland, Ohio

[21] Appl. No.: 626,591

[22] Filed: Apr. 2, 1996

[51] Int. Cl.$^6$ .......................... F16H 59/10; F16H 59/46; F16H 61/16
[52] U.S. Cl. ...................... 74/336 R; 364/424.081
[58] Field of Search .................. 74/336 R, 745; 364/424.081, 424.084, 424.085

[56] References Cited

U.S. PATENT DOCUMENTS

| | | | |
|---|---|---|---|
| 4,649,775 | 3/1987 | Ootani | 74/336 R |
| 4,754,665 | 7/1988 | Vandervoort | 74/745 |
| 5,000,060 | 3/1991 | Reynolds et al. | 74/745 |
| 5,193,410 | 3/1993 | Stine et al. | 74/336 |
| 5,263,379 | 11/1993 | Newbigging et al. | 74/336 |
| 5,390,561 | 2/1995 | Stine | 74/331 |
| 5,471,893 | 12/1995 | Newbigging | 74/335 |

Primary Examiner—Charles A. Marmor
Assistant Examiner—Nathan O. Jensen
Attorney, Agent, or Firm—Howard D. Gordon

[57] ABSTRACT

A manually shifted, range-type compound transmission (110) is provided with enhanced automatic range shifting. A controller (222) receives input signals indicative of shift lever position in the shift pattern (low range/high range) and of vehicle speed (OS) and automatically commands range shifts as a function of both system parameters.

25 Claims, 5 Drawing Sheets

MANUALLY SHIFTED TRANSMISSION WITH ENHANCED AUTOMATIC RANGE SHIFT

BACKGROUND OF THE INVENTION

1. Field of the Invention

The present invention relates to manually shifted range-type compound transmissions having enhanced automatic range shifting mechanisms and controls. In particular, the present invention relates to manually shifted range-type transmissions of the "H ½" or "double-H" type having an "autorange" type shift mechanism of the general kind disclosed in U.S. Pat. Nos. 3,492,202; 4,275,612; 4,455,883; 5,000,060 and 5,193,410, the disclosures of which are incorporated herein by reference, wherein the range shift controller will prevent range shifting at vehicle speeds at which such shifting is predetermined to be inappropriate.

2. Description of the Prior Art

Change-gear transmissions of the range type and of the combined range-and-splitter type are well known in the prior art, as may be seen by reference to U.S. Pat. Nos. 4,455,883; 4,754,665; 5,193,410; 5,000,060 and 5,390,561, the disclosures of which are incorporated herein by reference. Range-type transmissions having shift controls of the "multiple-H" type, as opposed to the "repeat-H" type, which utilize an automatic range shift mechanism responsive to movement of a shift lever from a first to a second area or portion of the shift pattern, are well known, as may be seen by reference to aforementioned U.S. Pat. Nos. 4,455,883; 4,974,468; 5,000,060 and 5,193,410.

While the prior art manually shifted, range-type transmissions utilizing automatic range shifting controls are widely used and commercially successful, they are not totally satisfactory, as, due to error or inattention, an operator may select a range shift inappropriate under current vehicle speed conditions, which shift will be automatically completed by the range actuator and usual synchronized range clutch assembly.

SUMMARY OF THE INVENTION

According to the present invention, the drawbacks of the prior art are minimized or overcome by the provision of an enhanced automatic range shifting mechanism and control for manually shifted, range-type transmissions which will prevent range shifts from being implemented at inappropriate vehicle speeds, regardless of shift lever movement from one range section to another range section of the manual shift pattern. The foregoing is accomplished in a manually shifted transmission with an automatic range shifting system by providing a controller for sensing the value of a parameter indicative to vehicle speed, as well as sensing shift lever positioning, and for permitting downshifts only if vehicle speed is less than a first reference value and/or permitting upshifts only if vehicle speed is greater than a second reference value.

Accordingly, it is an object of the present invention to provide a new and improved automatic range shifting mechanism and control for manually shifted, range-type transmissions.

This and other objects and advantages of the present invention will become apparent from a reading of the following description of the preferred embodiment taken in connection with the attached drawings.

DESCRIPTION OF THE PREFERRED EMBODIMENT

Figure 1:
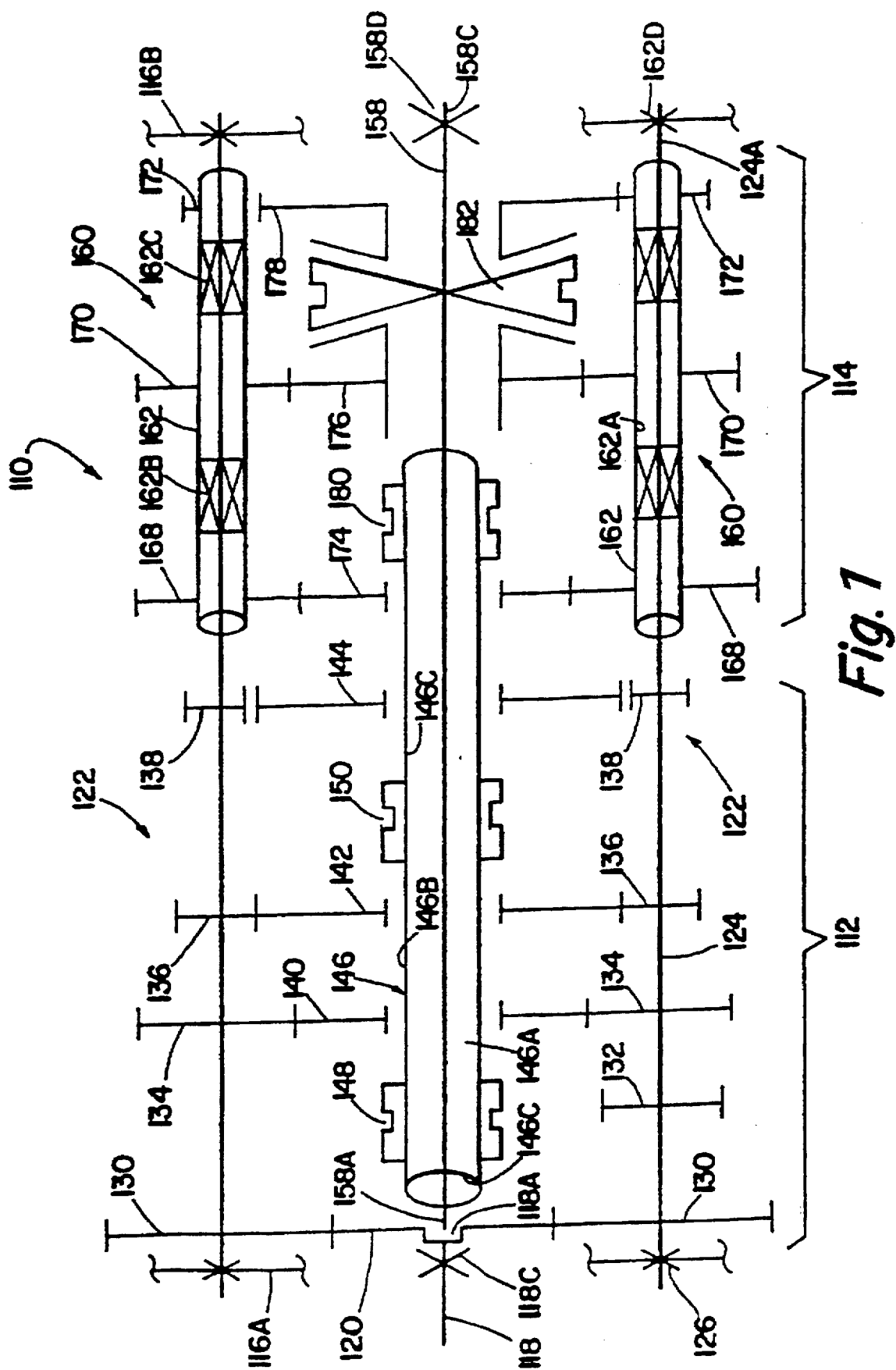
FIG. 1 is a schematic illustration of a compound combined range-and-splitter-type transmission utilizing the automatic range shifting mechanism of the present invention.
Figure 2:
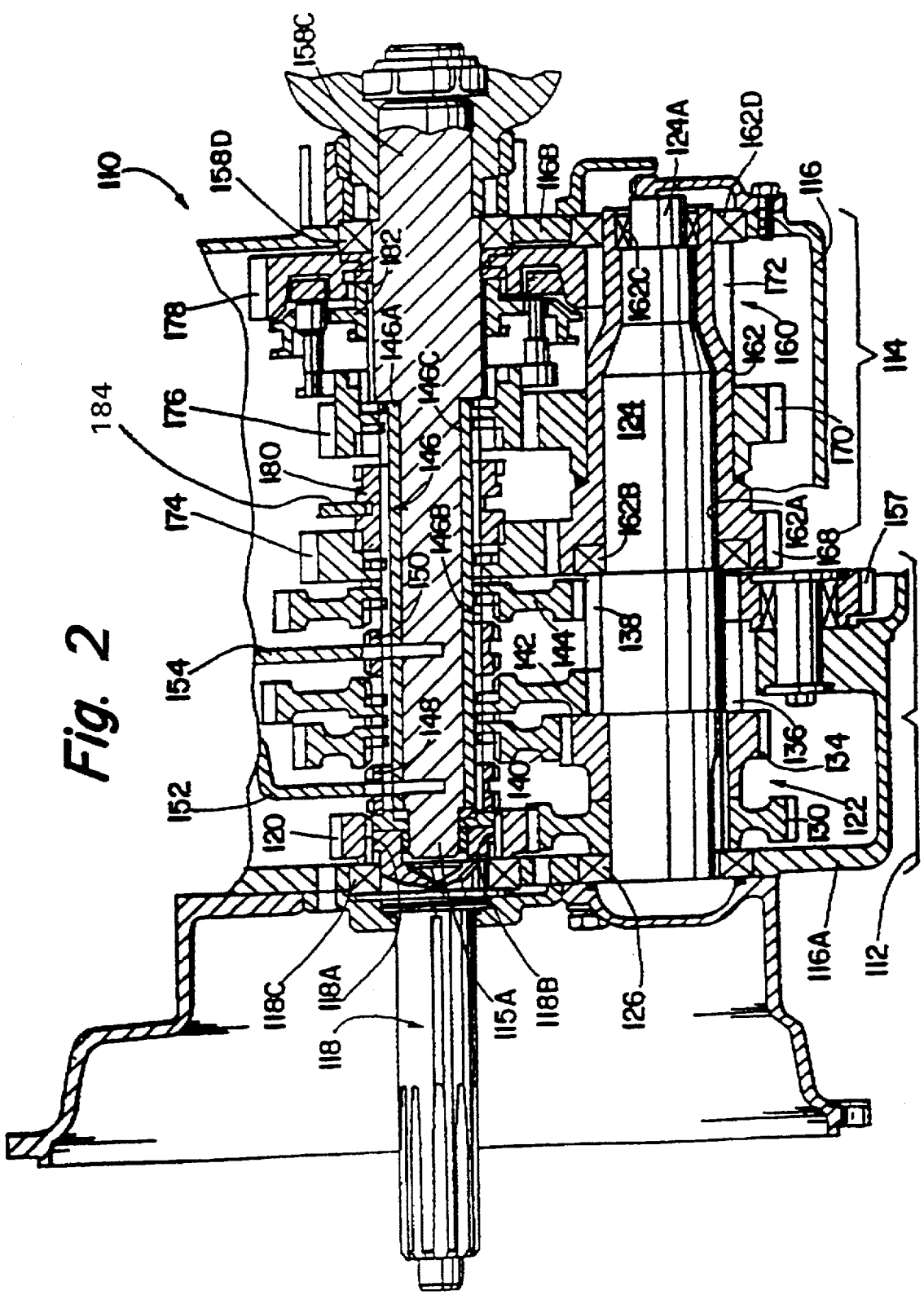
FIG. 2 is a sectional view of the transmission of FIG. 1.
Figure 3:
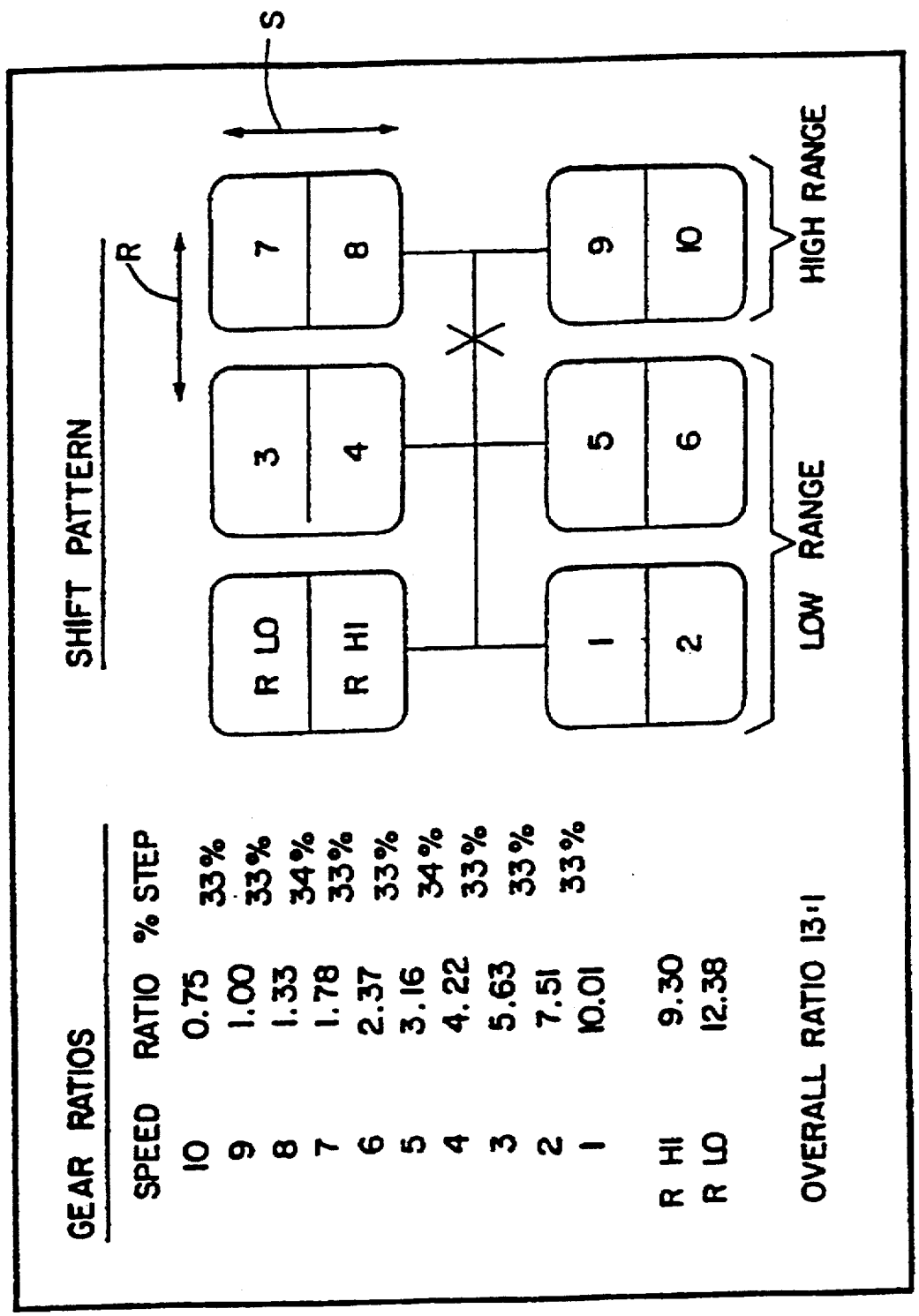
FIG. 3 illustrates a typical shift pattern and typical gear ratios for the transmission of FIGS. 1 and 2.
Figure 4:
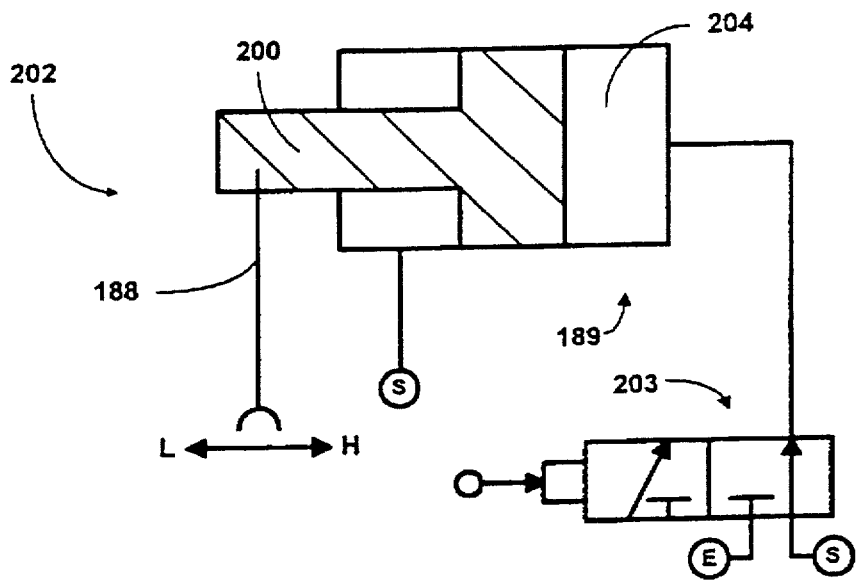
FIG. 4 is a schematic illustration of the range shifting mechanism of the present invention.

In FIGS. 1, 2 and 3, manually shifted transmission 110 of the type advantageously utilizing the enhanced automatic range shifting mechanism and control of the present invention is illustrated. Transmission 110 includes a main section 112 and an auxiliary section 114, both contained within housing 116. Housing 116 includes a forward end wall 116A and a rearward end wall 116B, but not an intermediate wall.

Input shaft 118 carries input gear 120 fixed for rotation therewith and defines a rearwardly opening pocket 118A wherein a reduced diameter extension 158A of output shaft 158 is piloted. A non-friction bushing 118B or the like may be provided in pocket or blind bore 118A. The forward end of input shah 118 is supported by bearing 118C in front end wall 116A, while the rearward end 158C of output shaft 158 is supported by bearing assembly 158D in rear and wall 116B. Bearing assembly 158D may be a pair of opposed taper bearings or a single roller or ball bearing, as is illustrated in FIG. 3.

The mainshaft 146, which carries mainshaft clutches 148 and 150, and the mainshaft splitter clutch 180 is in the form of a generally tubular body 146A having an externally splined outer surface 146B and an axially extending through bore, 146C for passage of output shaft 158. Shift forks 152 and 154 are provided for shifting clutches 148 and 150, respectively. Mainshaft 146 is independently rotatable relative to input shaft 118 and output shaft 158 and preferably is free for limited radial movements relative thereto.

The main section 112 includes two substantially identical main section countershaft assemblies 122 each comprising a main section countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144, respectively.

Main section countershaft 124 extends rearwardly into the auxiliary section, where its rearward end 124A is supported directly or indirectly in rear housing end wall 116B.

The auxiliary section 114 includes two substantially identical auxiliary countershaft assemblies 160, each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter, clutch 180 is fixed to mainshaft 146 for selectively clutching either gear 174 or 176 thereto, while synchronized range clutch 182 is fixed to output shaft 158 for selectively clutching either gear 176 or gear 178 thereto.

Auxiliary countershafts 162 are generally tubular in shape, defining a through bore 162A for receipt of the rearward extensions of the main section countershafts 124. Bearings or bushings 162B and 162C are provided to rotatably support auxiliary countershaft 162 on main section countershaft 124. Bearing 162D directly or indirectly supports the rear ends of countershafts 124 and 162 in the rear end wall 116B.

The splitter jaw clutch 180 is a two-position, non-synchronized clutch assembly which may be selectively positioned in the rightwardmost or leftwardmost positions for engaging either gear 176 or gear 174, respectively, to the mainshaft 146. Splitter jaw clutch 180 is axially positioned by means of a shift fork 184 controlled by a two- or three-position piston actuator, which is responsive to a driver selection switch such as a button or the like on the shift knob, as is known in the prior art. Two-position synchronized range clutch assembly 182 is a two-position clutch which may be selectively positioned in either the rightwardmost or leftwardmost positions thereof for selectively clutching either gear 178 or 176, respectively, to output shaft 158. Clutch assembly 182 is positioned by means of a shift fork 188 operated by means of a two-position piston device 189.

As may be seen by reference to FIGS. 2 and 3, by selectively axially positioning both the splitter clutch 180 and the range clutch 182 in the forward and rearward axial positions thereof, four distinct ratios of mainshaft rotation to output shaft rotation may be provided. Accordingly, auxiliary transmission section 114 is a three-layer auxiliary section of the combined range and splitter type providing four selectable speeds or drive ratios between the input (mainshaft 146) and output (output shaft 158) thereof. The main section 112 provides a reverse and three potentially selectable forward speeds. However, one of the selectable main section forward gear ratios, the low-speed gear ratios associated with mainshaft gear 142, is not utilized in the high range. Thus, transmission 110 is properly designated as a "(2+1)×(2×2)" type transmission providing nine or ten selectable forward speeds, depending upon the desirability and practicality of splitting the low gear ratio.

The shift pattern for shifting transmission 110 is schematically illustrated in FIG. 3. Divisions in the vertical direction at each gear lever position signify splitter shifts, while movement in the horizontal direction from the ¾ and ⅝ leg of the H pattern to the ⅞ and ⁹⁄₁₀ leg of the H pattern signifies a shift from the low range to the high range of the transmission. As discussed above, splitter shifting is accomplished responsive to a vehicle operator-actuated splitter button or the like, usually a button located at the shift lever knob, while operation of the range clutch shifting assembly is an automatic response to movement of the gear shift lever between the central and rightwardmost legs of the shift pattern (i.e., between the low range and high range portions, respectively), as illustrated in FIG. 3, and as will be described in greater detail below. Automatic range shift devices of this general type for manual shift transmissions are known in the prior art and may be seen by reference to U.S. Pat. Nos. 3,429,202; 4,275,612; 4,455,883 and 5,000,060.

Referring again to FIG. 3, and assuming it is desirable that a transmission have generally equal ratio steps, the main section ratio steps should be generally equal, the splitter step should be generally equal to the square root of the main section ratio steps, and the range step should equal about the main section ratio step raised to the $N^{TH}$ power where $N^{TH}$ equals the number of main section ratio steps occurring in both ranges (i.e., N=2 in the (2+1)×(2×2) transmission 110). Given the desired ideal ratios, gearing to approximate these ratios is selected. In the above example, the splitter steps are about 33.3%, while the range step is about 316%, which is generally suitable for a "2+1" main transmission section having about 78% steps, as the square root of 1.78 equals about 1.33 and 1.78 raised to the second power (i.e., N=2) equals about 3.16.

Transmissions similar to transmission 110 may be seen in greater detail by reference to aforementioned U.S. Pat. Nos. 4,754,665; 5,368,145 and 5,390,561.

Although the present invention is illustrated in the embodiment of a compound transmission not having an intermediate wall, the present invention is equally applicable to transmissions of the type illustrated in U.S. Pat. Nos. 4,754,665; 5,193,410 and 5,368,145.

As mentioned above, in the prior art, especially for manually shifted, range-type transmissions with an automatic range shifting mechanism, the synchronized range section clutch occasionally would complete range shifts selected in error or due to inattention, even if such shifts were undesirable under current vehicle speed conditions. By way of example, if during an intended 8th-to-9th speed shift at relatively high vehicle speeds, the shift lever is incorrectly moved to the ¾–⅝ leg, or worse yet, to the $R_L/R_H$–½ leg, and then moved downwardly into the engaged position, the shift, if completed, will be harsh with potential undue wear and/or damage to the synchronizer, the clutch teeth, the transmission and/or the vehicle. Similarly, if a range upshift is completed at an excessively low vehicle speed, the engine may be stalled and/or the shift undesirably harsh. Such inappropriate range shifting may become more likely if biasing means are not utilized to inhibit movement of the shift lever between legs of the shift pattern.

The range clutch 182 is moved by a shift fork 188 attached to an actuator piston 200 of the piston device 189. The actuator assembly 202 includes the piston device 189 and a valve device 203 operated by command output signals which may be electrical, fluidic and/or mechanical. The valve device 203 controls a selectively pressurized and exhausted chamber 204 to achieve the two positions (H, L) of the shift fork. Alternatively, as seen in aforementioned U.S. Pat. No. 5,000,060, an additional valve (not shown) responsive to command signals may be provided to selectively pressurize and exhaust the lefthand chamber of the actuator piston/cylinder assembly.

Figure 5:
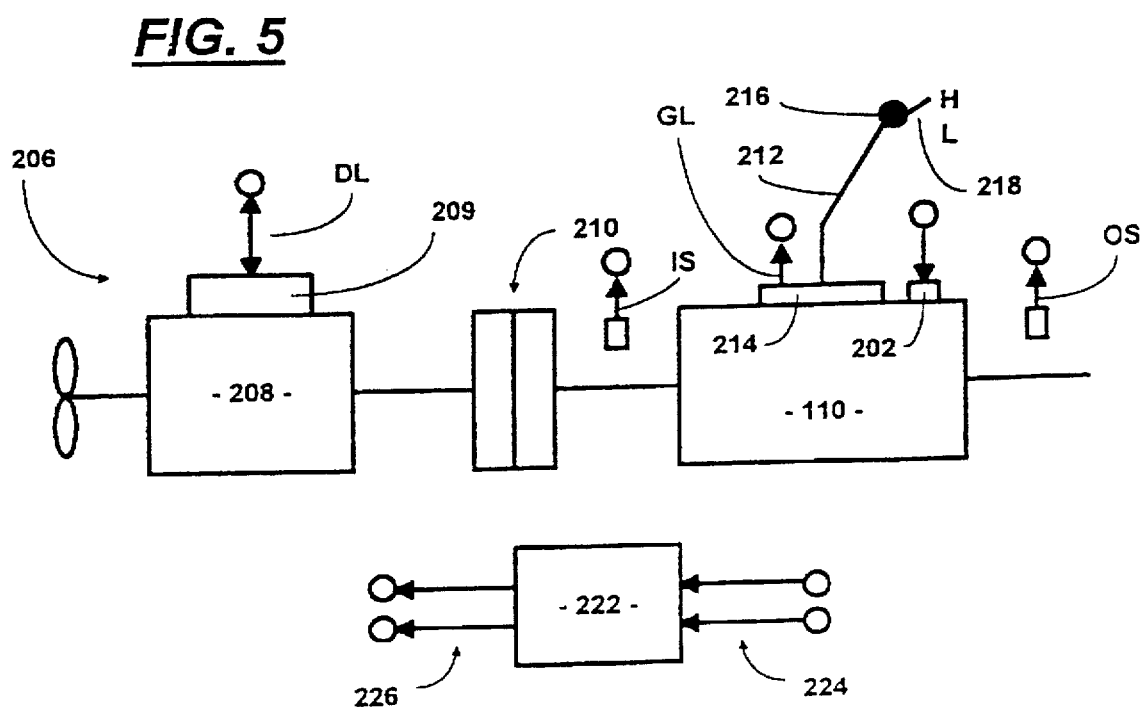
FIG. 5 is a schematic illustration of a transmission system utilizing the shifting mechanism and control of the present invention.

FIG. 5 illustrates a vehicular powertrain 206 utilizing the present invention. Powertrain 206 includes an internal combustion engine 208, a master clutch 210 and manually shifted, range-type transmission 110. A shift lever 212 operates a shift mechanism 214, such as a single shift shaft mechanism of the type illustrated in U.S. Pat. No. 4,920,815, the disclosure of which is incorporated herin by reference.

The shift lever 214 includes a knob 216 carrying a splitter master valve and selector 218 by which splitter high (H) or splitter low (L) may be selected.

A microprocessor-based controller 222 receives input signals 224 and processes same according to predetermined logic rules to issue command output signals 226 to various system actuators, including the range clutch actuator 202. The microprocessor 222 may be of the type illustrated in U.S. Pat. No. 4,595,986, the disclosure of which is incorporated herein by reference.

The engine 208 may include an electronic controller 209 communicating over an electronic data link DL utilizing the SAE J-1922, SAE J-1939 and/or ISO 11898 protocol. Sensors also may be provided to provide input signals indicative of input shaft (IS) and/or output shaft (OS) rotational speeds and/or of the position of the shift lever (GL). Output shaft speed is indicative of vehicle ground speed.

Figure 6:
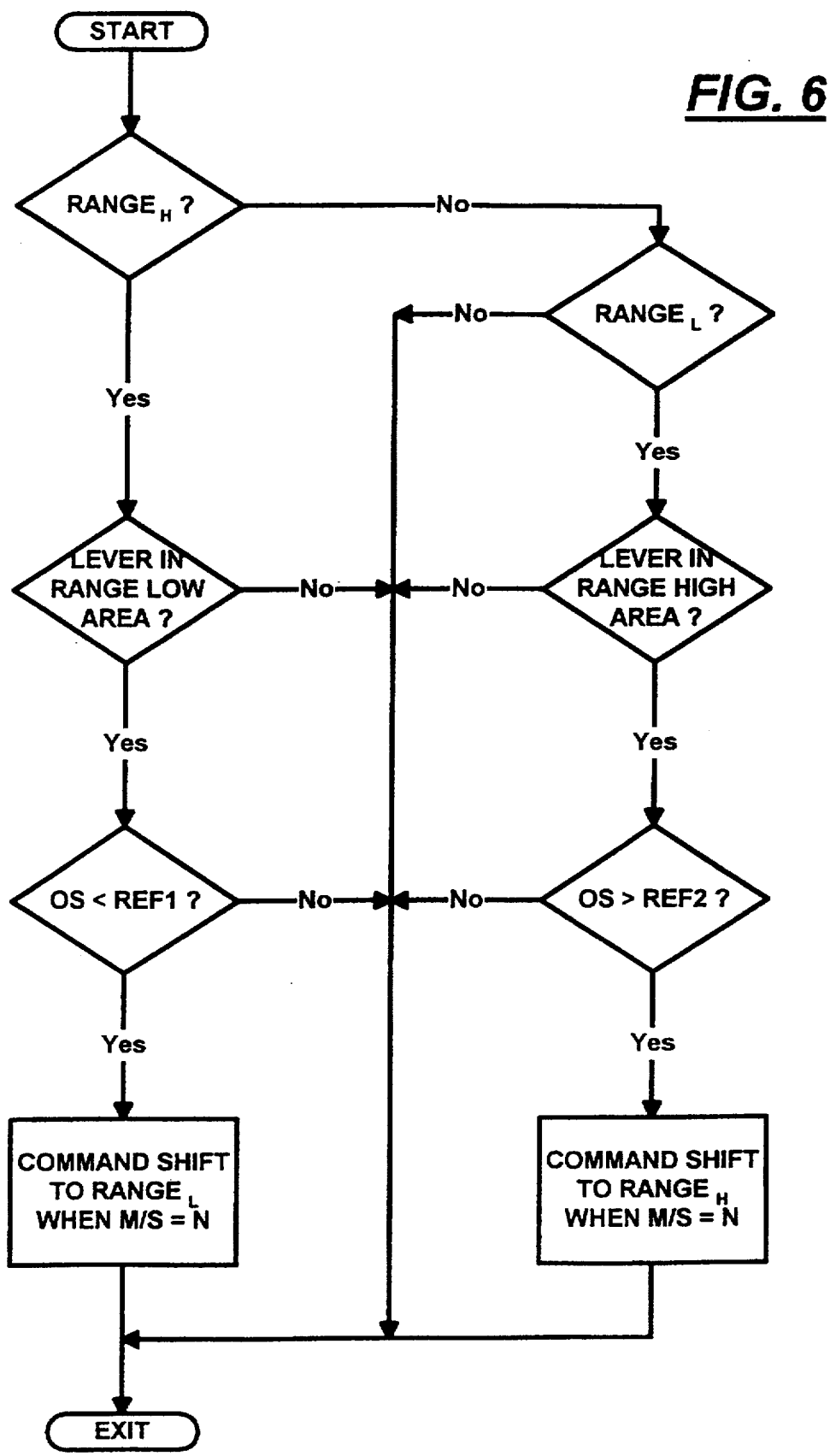
FIG. 6 is a schematic illustration, in flow chart format, of the automatic range shifting control of the present invention.

As may be seen by reference to FIG. 6, the controller 222 is provided with logic rules under which an automatic range upshift requires that the shift lever be moved into the range-high portion of the shift pattern ($7/8$–$9/10$ leg) and that vehicle speed be greater than a reference value (OS>REF$_2$), while an automatic range downshift requires that the shift lever be moved into the range-low portion of the shift pattern (R$_L$/R$_H$–$1/2$ or $3/4$–$5/6$ leg) and vehicle speed be less than a reference value (OS<REF$_1$). The logic also may require that main section neutral exists prior to commanding a range shift. By way of example, for heavy-duty diesel engines and transmissions of the type illustrated, no automatic range upshift would be permitted below about 5–15 MPH, while no automatic range downshift would be permitted above about 25–35 MPH.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A compound, manually shifted, change-gear transmission system comprising a range-type compound transmission (110) having a main transmission section (112) connected in series with a range-type auxiliary transmission section (114), said range-type auxiliary section including a double-acting range clutch (182) carrying a first set of clutch teeth for engaging a first array of clutch teeth associated with a low-range range gear upon axial movement of said range clutch in a first axial direction to a first position, and a second set of clutch teeth for engaging a second array of clutch teeth associated with a high-range range gear upon axial movement of said range clutch in a second axial direction to a second axial position, said transmission including a manually operated shift lever (212) having a shift pattern defining a low-range area and a high-range area, and a range sensor for sensing the position of said lever in said shift pattern and providing a first input signal indicative thereof, said system characterized by:

a speed sensor for sensing the value of a parameter indicative of vehicle speed and providing a second input signal (OS) indicative thereof;

an actuator (202) responsive to command output signals for causing said range clutch to move into a selected one of said first and second axial positions thereof;

a controller (222) for receiving a plurality of input signals including said first and second input signals and processing same in a predetermined manner to issue command output signals to at least said actuator, said controller commanding a shift into low-range only upon sensing said lever in the low-range area of said shift pattern and said second input signal being less than a first reference (REF$_1$) (OS<REF$_1$).

2. The transmission system of claim 1 wherein said controller will command a shift into high-range only upon sensing said lever in the high-range area of said shift pattern and said second input signal being greater than a second reference (REF$_2$) (OS>REF$_2$).

3. The system of claim 2 wherein said second reference is less than said first reference.

4. The system of claim 1 wherein said controller is microprocessor-based and said input signals and said command output signals are electric signals.

5. The system of claim 2 wherein said controller is microprocessor-based and said input signals and said command output signals are electric signals.

6. The system of claim 1 wherein said shift pattern is a multiple-H-type pattern having one or more legs in the low-range area and one or more legs in the high-range area.

7. The system of claim 2 wherein said shift pattern is a multiple-H-type pattern having one or more legs in the low-range area and one or more legs in the high-range area.

8. A method for controlling automatic range shifting in a compound, manually shifted, change-gear transmission system comprising a range-type compound transmission (110) having a main transmission section (112) connected in series with a range-type auxiliary transmission section (114) including a double-acting range clutch (182) carrying a first set of clutch teeth for engaging a first array of clutch teeth associated with a low-range range gear upon axial movement of said range clutch in a first axial direction to a first position, and a second set of clutch teeth for engaging a second array of clutch teeth associated with a high-range range gear upon axial movement of said range clutch in a second axial direction to a second axial position, a manually operated shift lever (212) having a shift pattern defining a low-range area and a high-range area, and a range sensor for sensing the position of said lever in said shift pattern and providing a first input signal indicative thereof, a speed sensor for sensing the value of a parameter indicative of vehicle speed and providing a second input signal (OS) indicative thereof, an actuator (202) responsive to command output signals for causing said range clutch to move into a selected one of said first and second axial positions thereof, and a controller (222) for receiving a plurality of input signals including said first and second input signals and processing same in a predetermined manner to issue command output signals to at least said actuator, said method characterized by:

commanding a shift into low-range only upon sensing said lever in the low-range area of said shift pattern and said second input signal being less than a first reference (REF$_1$) (OS<REF$_1$).

9. The method of claim 8 further characterized by:

commanding a shift into high-range only upon sensing said lever in the high-range area of said shift pattern and said second input signal being greater than a second reference (REF$_2$) (OS>REF$_2$).

10. The method of claim 9 wherein said second reference is less than said first reference.

11. The method of claim 8 wherein said controller is microprocessor-based and said input signals and said command output signals are electric signals.

12. The method of claim 9 wherein said controller is microprocessor-based and said input signals and said command output signals are electric signals.

13. The method of claim 8 wherein said shift pattern is a multiple-H-type pattern having one or more legs in the low-range area and one or more legs in the high-range area.

14. The method of claim 9 wherein said shift pattern is a multiple-H-type pattern having one or more legs in the low-range area and one or more legs in the high-range area.

15. A compound, manually shifted, change-gear transmission system comprising a range-type compound transmission having a main transmission section connected in series with a range-type auxiliary transmission section shiftable to a low-range and a high-range ratio, a manually operated shift lever having a shift pattern defining a low-range area and a high-range area, and a range sensor for sensing the position of said lever in said shift pattern and providing a first input signal indicative thereof, said system characterized by:

a speed sensor for sensing the value of a parameter indicative of vehicle speed and providing a second input signal indicative thereof;

an actuator responsive to command output signals for causing said range section to be shifted to a selected one of said low-range and high-range ratios;

a controller for receiving a plurality of input signals including said first and second input signals and processing same in a predetermined manner to issue command output signals to at least said actuator, said controller commanding a shift into low-range ratio only upon sensing said lever in the low-range area of said shift pattern and said second input signal being less than a first reference.

16. The transmission system of claim 15 wherein said controller will command a shift into high-range ratio only upon sensing said lever in the high-range area of said shift pattern and said second input signal being greater than a second reference.

17. The system of claim 15 wherein said controller is microprocessor-based and said input signals and said command output signals are electric signals.

18. The system of claim 16 wherein said controller is microprocessor-based and said input signals and said command output signals are electric signals.

19. The system of claim 15 wherein said shift pattern is a multiple-H-type pattern having one or more legs in the low-range area and one or more legs in the high-range area.

20. The system of claim 16 wherein said shift pattern is a multiple-H-type pattern having one or more legs in the low-range area and one or more legs in the high-range area.

21. A compound, manually shifted, change-gear transmission system comprising a range-type compound transmission having a main transmission section connected in series with a range-type auxiliary transmission section shiftable to a low-range and a high-range ratio, a manually operated shift lever having a shift pattern defining a plurality of low-range ratio positions and a plurality of high-range ratio positions, and range shift sensing means for sensing an operator intent to shift (a) from a low-range ratio position to a high-range ratio position and providing a first input signal indicative thereof, and (b) from a high-range ratio position to a low-range ratio position and providing a second input signal indicative thereof, said system characterized by:

a speed sensor for sensing the value of a parameter indicative of vehicle speed and providing a third input signal having a magnitude indicative thereof;

an actuator responsive to command output signals for causing said range section to be shifted to a selected one of said low-range and high-range ratios;

a controller for receiving a plurality of input signals including said first, second and third input signals and processing same in a predetermined manner to issue command output signals to at least said actuator, said controller commanding a shift into a low-range ratio only upon sensing an operator intent to shift from a high-range ratio position to a low-range ratio position and the magnitude of said third input signal being less than a first reference.

22. The transmission system of claim 20 wherein said controller will command a shift into a high-range ratio only upon sensing an operator intent to shift from a low-range ratio position to a high-range ratio position and the magnitude of said third input signal being greater than a second reference.

23. The system of claim 22 wherein said controller is microprocessor-based and said input signals and said command output signals are electric signals.

24. A microprocessor-based system controller for controlling range shifting in a compound, manually shifted, change-gear transmission system comprising a range-type compound transmission having a main transmission section connected in series with a range-type auxiliary transmission section shiftable to a low-range and a high-range ratio, a manually operated shift lever having a shift pattern defining a plurality of low-range ratio positions and a plurality of high-range ratio positions, and range shift sensing means for sensing an operator intent to shift (a) from a low-range ratio position to a high-range ratio position and providing a first input signal indicative thereof, and (b) from a high-range ratio position to a low-range ratio position and providing a second input signal indicative thereof;

a speed sensor for sensing the value of a parameter indicative of vehicle speed and providing a third input signal having a magnitude indicative thereof; and an actuator responsive to command output signals for causing said range section to be shifted to a selected one of said low-range and high-range ratios;

said system controller receiving a plurality of input signals including said first, second and third input signals and processing same in a predetermined manner to issue command output signals to at least said actuator, said controller commanding a shift into a low-range ratio only upon sensing an operator intent to shift from a high-range ratio position to a low-range ratio position and the magnitude of said third input signal being less than a first reference.

25. The system controller of claim 24 wherein said controller will command a shift into a high-range ratio only upon sensing an operator intent to shift from a low-range ratio position to a high-range ratio position and the magnitude of said third input signal being greater than a second reference.

* * * * *